US012717424B2

(12) United States Patent
Wang et al.

(10) Patent No.: US 12,717,424 B2
(45) Date of Patent: Aug. 25, 2026

(54) OPTICAL NAVIGATION MECHANISM FOR PROVIDING SMOOTH USER EXPERIENCE IN UNSTABLE AND WORSE ENVIRONMENT

(71) Applicant: PixArt Imaging Inc., Hsin-Chu City (TW)

(72) Inventors: Yen-Chang Wang, Hsin-Chu City (TW); Yen-Min Chang, Hsin-Chu City (TW)

(73) Assignee: PixArt Imaging Inc., Hsin-Chu City (TW)

( * ) Notice: Subject to any disclaimer, the term of this patent is extended or adjusted under 35 U.S.C. 154(b) by 0 days.

(21) Appl. No.: 18/757,561

(22) Filed: Jun. 28, 2024

(65) Prior Publication Data

US 2026/0003441 A1 Jan. 1, 2026

(51) Int. Cl.
*G06F 3/03* (2006.01)
*H04W 4/38* (2018.01)

(52) U.S. Cl.
CPC ............ *G06F 3/0304* (2013.01); *H04W 4/38* (2018.02); *G06F 2212/7203* (2013.01)

(58) Field of Classification Search
CPC ........... G06F 3/0304; G06F 2212/7203; G06F 3/0317; G06F 3/03543; G06F 3/038; G06F 3/0383; H04W 4/38
See application file for complete search history.

(56) References Cited

U.S. PATENT DOCUMENTS

| | | | | |
|---|---|---|---|---|
| 11,200,188 B1 * | 12/2021 | Chen | .................. | G06F 13/4068 |
| 2021/0373678 A1 * | 12/2021 | Chauvin | .............. | G06F 3/0383 |
| 2023/0117661 A1 * | 4/2023 | Zhang | .................. | G06F 1/3215 711/151 |
| 2025/0036222 A1 * | 1/2025 | Wong | .................. | G06F 13/385 |

FOREIGN PATENT DOCUMENTS

JP H08289166 A * 11/1996

OTHER PUBLICATIONS

Machine translation of JP H08289166A (Year: 1996).*

* cited by examiner

*Primary Examiner* — Patrick N Edouard
*Assistant Examiner* — Joseph P Fox
(74) *Attorney, Agent, or Firm* — Winston Hsu

(57) ABSTRACT

A method of an optical navigation device includes: providing an optical sensor to generate at least one image frame to obtain displacement data; transmitting the displacement data into a microcontroller for optical navigation, the displacement being a relative displacement between the optical navigation device and an adjacent working surface; and, dynamically using different report rates to report the displacement data to a host device to be externally coupled to optical navigation device through a specific communication interface in response to a result of detecting environment signal interference or a result of a loading of the host device.

8 Claims, 2 Drawing Sheets

OPTICAL NAVIGATION MECHANISM FOR PROVIDING SMOOTH USER EXPERIENCE IN UNSTABLE AND WORSE ENVIRONMENT

BACKGROUND OF THE INVENTION

1. Field of the Invention

The invention relates to an optical navigation mechanism, and more particularly to an optical navigation device, a corresponding dongle device, and corresponding method.

2. Description of the Prior Art

Generally speaking, the outputs of displacement data of a conventional optical navigation device such as a conventional gaming mouse device may be frequently stuck and stopped due to an unstable and worse radio environment and/or a heavy loading of the computer system of the host device externally coupled to the conventional gaming mouse device. In this situation, the user experience is worse.

SUMMARY OF THE INVENTION

Therefore one of the objectives of the invention is to provide an optical navigation device and corresponding method, to solve the above-mentioned problems.

According to an embodiment of the invention, an optical navigation device is disclosed. The optical navigation device comprises an optical sensor and a microcontroller. The optical sensor is used for and capable of generating at least one image frame to obtain displacement data and used for transmitting the displacement data into a microcontroller for optical navigation, and the displacement is a relative displacement between the optical navigation device and an adjacent working surface. The microcontroller is coupled to the optical sensor and used for dynamically using different report rates to report the displacement data to a host device to be externally coupled to optical navigation device through a specific communication interface in response to a result of detecting environment signal interference or a result of a loading of the host device.

According to an embodiment of the invention, a dongle device is disclosed. The dongle device is to be paired with an optical navigation device and coupled between the optical navigation device and a host device. The dongle device comprises a buffer and a control circuit. The buffer is used for temporarily buffering displacement data sent from the optical navigation, and the buffered displacement data is to be fetched by the host device. The control circuit is coupled to the buffer and used for periodically detecting a data amount of the displacement data currently buffered in the buffer and for dynamically transmitting an indication signal to the optical navigation device to control the optical navigation device dynamically using different report rates to report the displacement data in response to a change of the data amount.

According to an embodiment of the invention, a method of an optical navigation device is disclosed. The method comprises: providing an optical sensor to generate at least one image frame to obtain displacement data; transmitting the displacement data into a microcontroller for optical navigation, the displacement being a relative displacement between the optical navigation device and an adjacent working surface; and, dynamically using different report rates to report the displacement data to a host device to be externally coupled to optical navigation device through a specific communication interface in response to a result of detecting environment signal interference or a result of a loading of the host device.

According to an embodiment of the invention, a method of a dongle device is disclosed. The dongle device is to be paired with an optical navigation device and coupled between the optical navigation device and a host device. The method comprises: using a buffer for temporarily buffering displacement data sent from the optical navigation, the buffered displacement data to be fetched by the host device; periodically detecting a data amount of the displacement data currently buffered in the buffer; and, dynamically transmitting an indication signal to the optical navigation device to control the optical navigation device dynamically using different report rates to report the displacement data in response to a change of the data amount.

These and other objectives of the present invention will no doubt become obvious to those of ordinary skill in the art after reading the following detailed description of the preferred embodiment that is illustrated in the various figures and drawings.

DETAILED DESCRIPTION

The invention aims at providing a technical solution of an optical navigation device, corresponding dongle device, and corresponding method capable of providing a smooth user experience even when the optical navigation device is in an unstable and worse radio environment and/or when a heavy loading of the computer system of the host device externally coupled to the provided optical navigation device.

Figure 1:
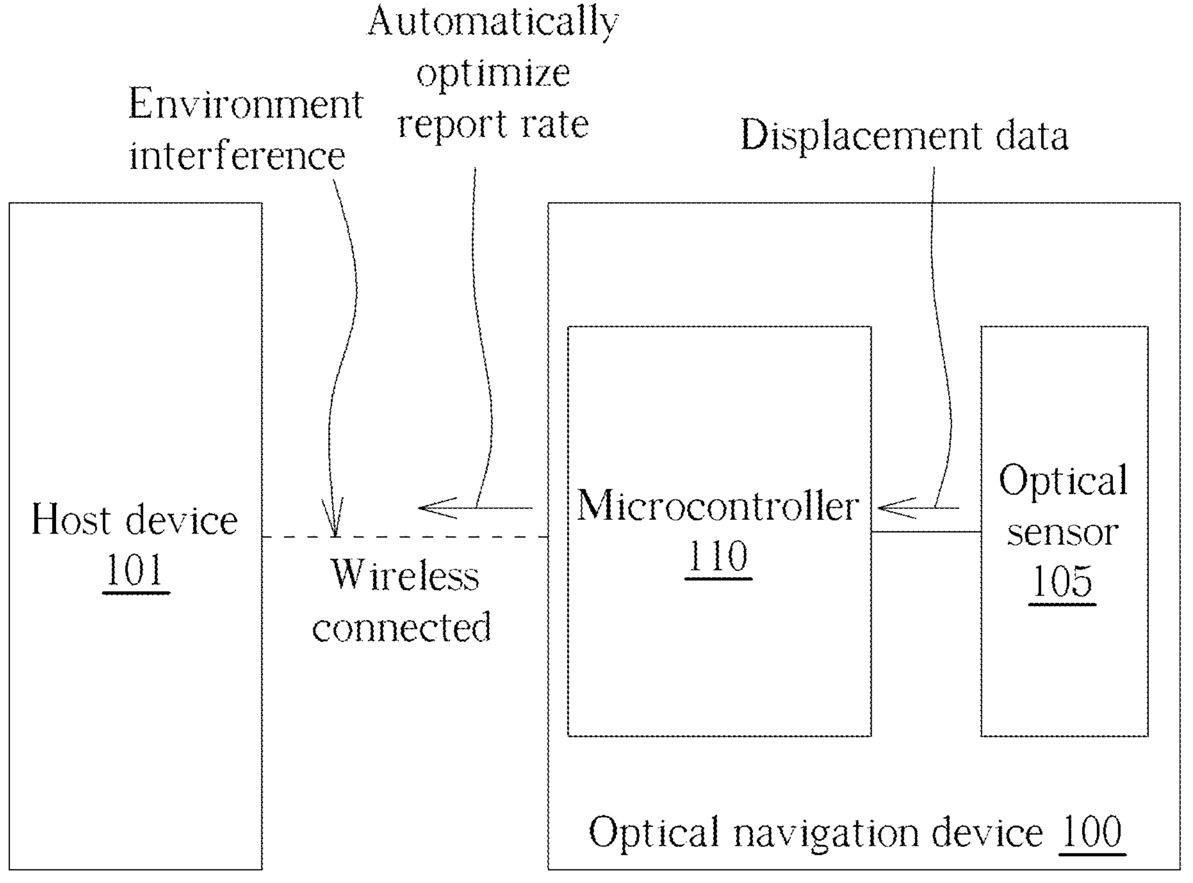
FIG. 1 is a diagram of an optical navigation device such as an optical mouse deice according to an embodiment of the invention.

FIG. 1 is a diagram of an optical navigation device 100 such as an optical mouse device (not limited) according to an embodiment of the invention. The optical navigation device 100 for example can be a gaming mouse device which supports different frame resolution settings such as different CPI (Counts Per Inch) settings or different DPI (Dots Per Inch) settings. The optical navigation device 100 is coupled/connected to the host device 101 through a specific communication interface such as a wireless USB communication interface, and the optical navigation device 100 comprises an optical sensor 105 and a microcontroller 110.

The optical sensor 105 is used for and capable of sensing and generating at least one image frame to obtain displacement data and used for transmitting the displacement data into the microcontroller 110 for optical navigation. The displacement data is associated with a relative displacement between the optical navigation device 100 and an adjacent working surface which for example is the working surface that the optical navigation device 100 is placed onto (but not limited).

The microcontroller 110 is coupled to the optical sensor 105 and used for transmitting and reporting the displacement data to the host device 101. The microcontroller 110 has different report rate settings such as different report rates respectively corresponding to different report time intervals used by the optical navigation device 100 for the host device 101. For example, the different report rates may be 125 Hz (Hertz), 500 Hz, 1000 Hz, 2000 Hz, 4000 Hz, and 8000 Hz respectively corresponding to the different report time intervals 8 ms (milliseconds), 4 ms, 2 ms, 1 ms, 500 us (microseconds), 250 us, and 12 us; however, this is not intended to be a limitation. The used and selected report rate is faster, the cursor accuracy of the optical navigation device 100 on the screen of the host device 101 is better. For example, when the selected and used report rate is higher/faster, the more clickable picture positions can be clicked by the user. This is beneficial to the accuracy control of the optical navigation.

In a bad operating condition such as a bad wireless environment, the cursor outputs, transmitted to the screen of the host device 101, may be stuck and stopped temporarily due to that more interferences occur in the wireless environment or the performance of the computer system running on the host device 101 is not enough. For example, in the bad wireless environment, more noise interferences occur and the displacement data reported from the optical navigation device 100 into the host device 101 may be lost, and thus the cursor outputs may be stuck and stopped temporarily until the subsequent reported displacement data is not lost. In addition, when the loading of the computer system running on the host device 101 is heavy, cursor outputs, transmitted to the screen, may be stuck and stopped. These may decrease the user experience.

To avoid decreasing the user experience, the operations of the optical navigation device 100 can automatically increase up or decrease down the currently used report rate so as to create a good/smooth user experience in the bad operating condition. In practice, the microcontroller 110 is arranged to detect the environment signal interference(s) or detect/obtain a result of the loading of the computer system running on the host device 101 (i.e. the loading of host device 101), and then it is arranged to dynamically using different report rates to report the displacement data to the host device 101 through the specific communication interface in response to the result of detecting environment signal interference(s) or the result of loading of the host device.

For example (but not limited), the microcontroller 110 is arranged to periodically detecting whether signal interference occurs in the environment, e.g. detecting whether interferences occur in coherent channel(s), adjacent channel(s), and/or radio frequency channel(s). If detecting that no signal interferences occur, then the microcontroller 110 is arranged to use a higher/highest report rate as its target report rate (i.e. the resultant report rate) to report the displacement data from the optical navigation device 100 to the host device 101. If detecting that the signal interference occurs, then the microcontroller is arranged to automatically use a lower/lowest report rate as its target report rate to report the displacement data from the optical navigation device 100 to the host device 101. For instance, the microcontroller 110 can periodically detect/measure the signal strength (e.g. Received Signal Strength Indicator (RSSI)) of the signals transmitted between the host device 101 and optical navigation device 100. When detecting a good or better RSSI, the microcontroller 110 can use a higher/highest report rate as its target report rate. When detecting a bad or worse RSSI, the microcontroller 110 can use a lower/lowest report rate as its target report rate. In other words, if more interferences occur in the environment, then the microcontroller 110 may automatically control the currently used report rate down to a lower report rate so as to make the user experience be smooth since the lower report rate can increase the times of radio-frequency re-transmission to avoid data lost. When few interferences occur in the environment, then the microcontroller 110 may automatically increase the lower report rate back to the previously used higher report rate. If the radio-frequency environment is clean, then the microcontroller 110 can automatically increase the currently used report rate up to the higher/highest report rate.

In other embodiments, the microcontroller 110 is arranged to periodically detecting whether signal interference occurs, and it is arranged to use a specified report rate as a target report rate to report the displacement data in a default setting. If detecting that the signal interference occurs, then the microcontroller 110 is arranged to decrease the target report rate. If detecting that no signal interferences occur, then the microcontroller 110 is arranged to increase the decreased target report rate back to the specified report rate. For example, the target report rate may be a highest report rate which can be used by the optical navigation device (e.g. a gaming mouse device) negotiated between the optical navigation device and the host device in advance, and the microcontroller 110 may decrease the highest report rate down to an appropriate lower report rate if detecting the signal interference occurs. This can significantly improve the user experience when the wireless/radio environment is not stable.

In another embodiment, the loading of the host device 101 may be considered by the microcontroller 110 to automatically adjust the used report rate. For example, the microcontroller 110 is arranged to automatically use a higher/highest report rate as its target report rate to report the displacement data if receiving the host device's 101 indication signal indicating a light loading condition. Instead, the microcontroller 110 is arranged to automatically use a lower/lowest report rate as its target report rate to report/transmit the displacement data if receiving the host device's 101 indication signal indicating a heavy loading condition. That is, when the performance/resource of the computer system running on the host device 101 is not enough, the microcontroller 110 can decrease the used report rate down to a lower report rate so as to prevent the performance of the computer system running on the host device 101 from becoming low or poor due to the displacement data frequently sent by the optical navigation device 100.

Figure 2:
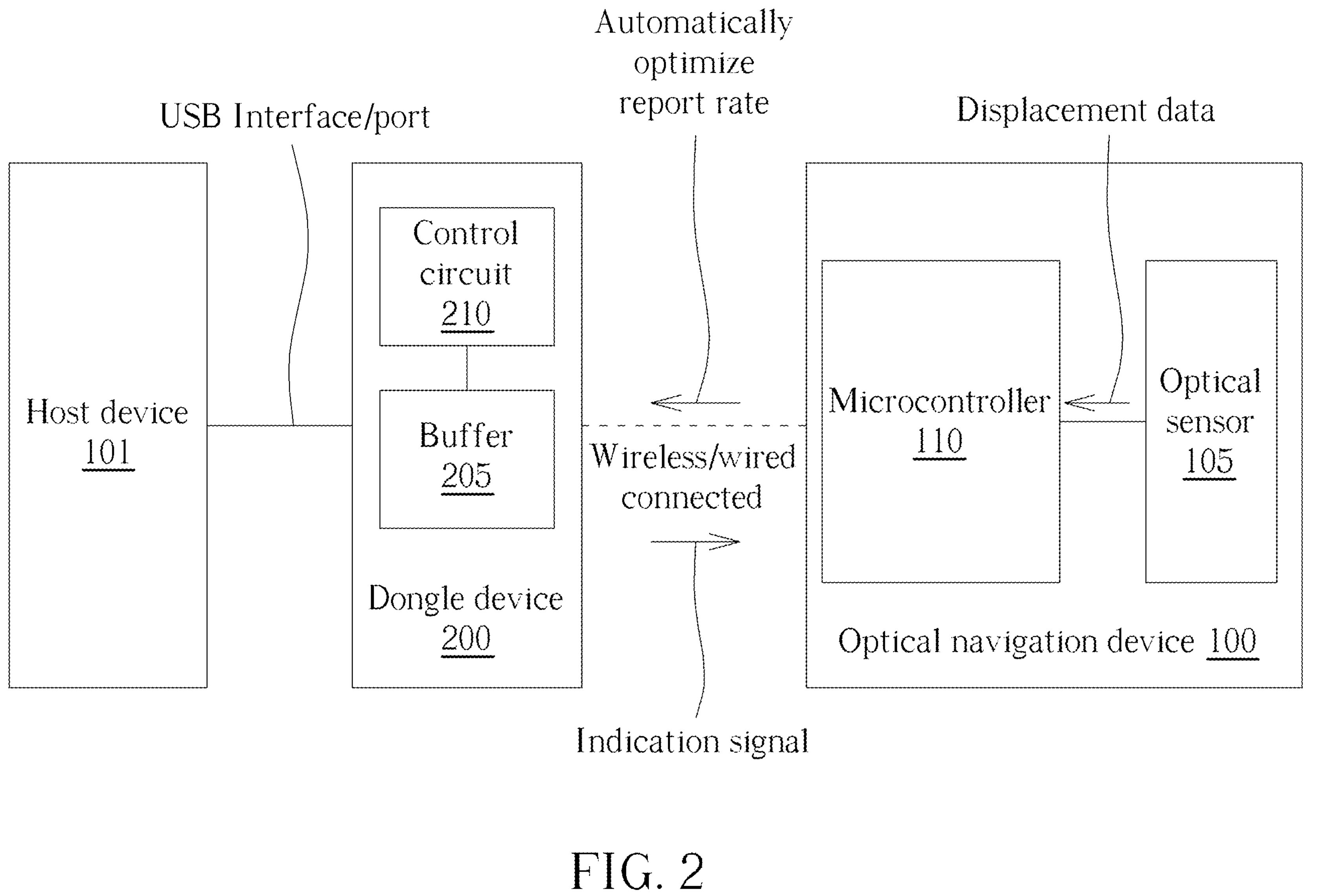
FIG. 2 is a diagram of the corresponding dongle device according to an embodiment of the invention.

In one embodiment, the report rate used by the optical navigation device 100 can be dynamically adjusted and changed by a corresponding dongle device which is paired with the optical navigation device 100, wireless connected to the optical navigation device, and coupled between the optical navigation device 100 and the host device 101. FIG. 2 is a diagram of the corresponding dongle device 200 according to an embodiment of the invention. The dongle device 200 comprises a buffer 205 and a control circuit 210. In practice, the buffer 205 is used for temporarily buffering displacement data sent from the optical navigation device 100 through the specific communication interface, and the buffered displacement data is to be fetched by the host device's 101 computer system. The control circuit 210 is coupled to the buffer 205 and used for periodically detecting a data amount of the displacement data currently buffered in the buffer 205 and for dynamically transmitting the above-mentioned indication signal to the optical navigation device 100 to control the optical navigation device 100 (or microcontroller 110) dynamically using different report rates to report the displacement data in response to a change of the data amount stored in the buffer 205 and/or a change of data amount fetched by the computer system of host device 101.

For example, in one embodiment, the computer system of host device 101 may use a specific rate to fetch the data stored in the buffer 205; that is, the data amount fetched by the computer system of host device 101 from the buffer 205 is supposed to be identical at different timings. Actually, the specific rate may be varied in different loading condition. If detecting that the data amount stored in the buffer 205 decreases down to a specific low level, then this may indicate that the report rate used by the optical navigation device 100 is lower compared to the specific rate used for fetching the data stored in the buffer 205. Thus, in this situation, the control circuit 210 may determine that the loading condition of the computer system running on the host device 101 is light since the specific rate used for fetching the data is higher, and the control circuit 210 transmits the indication signal into the optical navigation device 100 to control the optical navigation device 100 using a higher report rate.

If detecting that the data amount stored in the buffer 205 increases up to a specific high level, then this may indicate that the report rate used by the optical navigation device 100 is higher compared to the specific rate used for fetching the data stored in the buffer 205. Thus, in this situation, the control circuit 210 may determine that the loading condition of the computer system running on the host device 101 is heavy since the specific rate used for fetching the data is lower, and the control circuit 210 transmits the indication signal into the optical navigation device 100 to control the optical navigation device 100 using a lower report rate.

Similarly, the control circuit 210 can detect the change of data amount fetched by the computer system of host device 101 from the buffer 205. If detecting that the periodically fetched data amount increases up to a specific high level, then this may indicate that the report rate currently used by the optical navigation device 100 is lower compared to the specific rate used for fetching the data. Thus, in this situation, the control circuit 210 may determine that the loading condition of the computer system running on the host device 101 is light since the specific rate used for fetching the data is comparatively higher, and the control circuit 210 transmits the indication signal into the optical navigation device 100 to control the optical navigation device 100 using a higher report rate. If detecting that the periodically fetched data amount decreases down to a specific low level, then this may indicate that the report rate currently used by the optical navigation device 100 is higher compared to the specific rate used for fetching the data. Thus, in this situation, the control circuit 210 may determine that the loading condition of the computer system running on the host device 101 is heavy since the specific rate used for fetching the data is comparatively lower, and the control circuit 210 transmits the indication signal into the optical navigation device 100 to control the optical navigation device 100 using a lower report rate.

Further, it should be noted that, in other embodiments, the control circuit 210 may transmit the indication signal to control the optical navigation device 100 keeping/maintaining the currently used report rate if detecting that the periodically fetched data amount is between the high and low levels or detecting that the data amount stored in the buffer 205 is between the high and low levels. This can avoid frequently adjusting the report rate. In different embodiments, the report rate may be adjusted step by step. These modifications also fall within the scope of the invention.

Further, in one embodiment, the control circuit 210 may transmit the indication signal to negotiate with the optical navigation device 100 using a specified report rate as a target report rate to report the displacement data in a default setting. The control circuit 210 transmits the indication signal to control the optical navigation device decreasing the target report rate if detecting that the data amount of buffer 205 increases up to a specific high level and then to control the optical navigation device increasing the target report rate back to the specified report rate if detecting that the data amount of buffer 205 decreases down to a specific low level. In addition, the specific report rate can be a highest report rate negotiated between the optical navigation device 100 and the dongle device 200 in advance; for example, the optical navigation device 100 in this example may be a gaming mouse device.

Those skilled in the art will readily observe that numerous modifications and alterations of the device and method may be made while retaining the teachings of the invention. Accordingly, the above disclosure should be construed as limited only by the metes and bounds of the appended claims.

What is claimed is:

1. An optical navigation device, comprising:

an optical sensor, for generating at least one image frame to obtain displacement data and used for transmitting the displacement data into a microcontroller for optical navigation, wherein the displacement is a relative displacement between the optical navigation device and an adjacent working surface; and the microcontroller, coupled to the optical sensor, for dynamically using different report rates to report the displacement data from the optical navigation device to a host device to be externally coupled to the optical navigation device through a specific communication interface in response to a result of the microcontroller detecting environment signal interference or a result of the microcontroller detecting a loading condition of the host device;

wherein the displacement data is transmitted from the optical navigation device to the host device based on a different report rate, dynamically determined by the microcontroller, in response to a different loading condition of the host device; and, the microcontroller is arranged to periodically detecting whether signal interference occurs, is arranged to automatically use a higher report rate to report the displacement data if detecting that no signal interferences occur, and is arranged to automatically use a lower report rate to report the displacement data if detecting that the signal interference occurs; a dongle device, coupled between the optical navigation device and the host device, comprises a control circuit for monitoring a cumulative data amount of the displacement data on the specific communication interface; when the control circuit detects that the cumulative data amount increases up to a specific high level, the dongle device automatically transmits an indication signal to the optical navigation device to indicate a heavy loading condition to control the microcontroller to dynamically decrease to the lower report rate; and when the control circuit detects that the cumulative data amount decreases down to a specific low level, the dongle device transmits the indication signal to negotiate with the optical navigation device to immediately restore to the higher report rate.

2. The optical navigation device of claim 1, wherein the microcontroller is arranged to automatically use the higher report rate to report the displacement data if receiving the host device's indication signal indicating a light loading condition, and is arranged to automatically use the lower report rate to report the displacement data if receiving the host device's indication signal indicating the heavy loading condition.

3. The optical navigation device of claim 1, wherein the microcontroller is arranged to periodically detecting whether signal interference occurs, and is arranged to use a specified report rate as a target report rate to report the displacement data in a default setting; and, the microcontroller is arranged to decrease the target report rate if detecting that the signal interference occurs and then is arranged to increase the decreased target report rate back to the specific report rate if detecting that no signal interferences occur.

4. The optical navigation device of claim 3, wherein the specific report rate is a highest report rate negotiated between the optical navigation device and the host device in advance.

5. A method of an optical navigation device, comprising:

providing an optical sensor to generate at least one image frame to obtain displacement data;

transmitting the displacement data into a microcontroller for optical navigation, the displacement being a relative displacement between the optical navigation device and an adjacent working surface;

dynamically using different report rates to report the displacement data from the optical navigation device to a host device to be externally coupled to the optical navigation device through a specific communication interface in response to a result of using the microcontroller to detect environment signal interference or a result of using the microcontroller to detect a loading condition of the host device;

periodically detecting whether signal interference occurs;

automatically using a higher report rate to report the displacement data if detecting that no signal interferences occur; and automatically using a lower report rate to report the displacement data if detecting that the signal interference occurs;

wherein the displacement data is transmitted from the optical navigation device to the host device based on a different report rate, dynamically determined by the microcontroller, in response to a different loading condition of the host device; a dongle device, coupled between the optical navigation device and the host device, comprises a control circuit for monitoring a cumulative data amount of the displacement data on the specific communication interface; when the control circuit detects that the cumulative data amount increases up to a specific high level, the dongle device automatically transmits an indication signal to the optical navigation device to indicate a heavy loading condition to control the microcontroller to dynamically decrease to the lower report rate; and when the control circuit detects that the cumulative data amount decreases down to a specific low level, the dongle device transmits the indication signal to negotiate with the optical navigation device to immediately restore to the higher report rate.

6. The method of claim 5, further comprising:

automatically using the higher report rate to report the displacement data if receiving the host device's indication signal indicating a light loading condition; and automatically using the lower report rate to report the displacement data if receiving the host device's indication signal indicating the heavy loading condition.

7. The method of claim 5, further comprising:

periodically detecting whether signal interference occurs;

using a specified report rate as a target report rate to report the displacement data in a default setting; and decreasing the target report rate if detecting that the signal interference occurs and then increasing the decreased target report rate back to the specific report rate if detecting that no signal interferences occur.

8. The method of claim 7, wherein the specific report rate is a highest report rate negotiated between the optical navigation device and the host device in advance.

* * * * *